United States Patent [19]

Lindeman et al.

[11] 4,330,442
[45] May 18, 1982

[54] ASBESTOS FREE GASKET FORMING COMPOSITIONS

[75] Inventors: Charles M. Lindeman; Ralph D. Andrew, both of Lancaster, Pa.

[73] Assignee: Armstrong World Industries, Inc., Lancaster, Pa.

[21] Appl. No.: 148,669

[22] Filed: May 7, 1980

[51] Int. Cl.$^3$ .......................... C08K 7/08; C08K 7/10; C08K 7/04; C08K 7/02
[52] U.S. Cl. ................. 524/16; 188/251 A; 188/251 M; 524/256; 524/425; 524/426; 524/435; 524/434; 524/437; 524/448; 524/449; 524/445; 524/451
[58] Field of Search ................. 260/17.2, 38; 188/251 A, 251 M; 428/281, 283, 288

[56] References Cited

U.S. PATENT DOCUMENTS

| | | | |
|---|---|---|---|
| 2,473,319 | 6/1949 | Winkelmann | 260/19 |
| 3,344,099 | 9/1967 | Cahell et al. | 260/23.7 |
| 3,556,922 | 8/1968 | Green et al. | 161/156 |
| 3,714,111 | 1/1973 | Economy et al. | 260/38 |
| 3,915,906 | 10/1975 | Romey | 260/3 |
| 4,075,158 | 2/1978 | Coale | 260/42.17 |
| 4,119,591 | 10/1978 | Aldrich | 260/17.2 |
| 4,219,452 | 8/1980 | Littlefield | 260/38 |
| 4,242,241 | 12/1980 | Rosen et al. | 260/17.2 |
| 4,244,994 | 1/1981 | Trainor et al. | 188/251 A |

Primary Examiner—V. P. Hoke

[57] ABSTRACT

An asbestos-free gasket forming composition is disclosed. The composition is preferably produced by removing water from an aqueous furnish composition comprising phenolic fibers, aromatic polyamide fibers, an inorganic or cork filler, a synthetic rubber binder, and a water insoluble hydroxide produced from a soluble salt selected from the group consisting of aluminum salts, ferric salts and stannic salts, by reaction with a sufficient amount of an alkaline hydroxide to provide a furnish pH within the range of from about 6 to about 10, and preferably of from about 7 to 8.

15 Claims, No Drawings

ASBESTOS FREE GASKET FORMING COMPOSITIONS

BACKGROUND OF THE INVENTION

This invention relates to asbestos-free, gasket forming compositions. More specifically, this invention relates to beater saturated, water-laid, asbestos-free, gasket forming compositions which exhibit excellent tensile strength, heat resistance and creep relaxation.

Asbestos-containing gaskets are well-known and have achieved significant commercial success. Asbestos-containing gasket forming compositions are typically produced by beater saturating asbestos fibers with a rubber latex in an aqueous system and forming the composition on a conventional paper making equipment. The commercial success of asbestos-containing gaskets has been primarily due to the physical and chemical properties imparted to the gaskets by the asbestos fibers. The asbestos fibers facilitate the production and processability of the gaskets and said gaskets exhibit excellent tensile strength, heat resistance, creep relaxation and are alkali, moisture and microbiologically resistant. Such properties make asbestos-containing gaskets particularly useful in applications where they will be exposed to high flange pressure and high temperaures. Thus, these gaskets have been extensively employed in the automotive and compressor industries. Not surprisingly, no other single fibrous material is known which can replace asbestos fibers in gasket materials and provide gasket materials having acceptable properties, especially creep resistance and tensile strength.

Unfortunately, recent medical evidence indicates that asbestos fibers can cause health hazards, particularly when inhaled. These health hazard problems of asbestos fibers are well-known, and accordingly, the gasket industry has been searching for replacement gasket forming compositions which do not contain asbestos fibers but yet achieve substantially the same physical and chemical properties as the prior art asbestos containing gasket forming compositions.

According to this invention, there is provided a beater saturated, water-laid, asbestos-free, rubberized gasket forming composition, typically in the form of a felt sheet, which exhibits excellent tensile strength, heat resistance and creep resistance and which comprises phenolic fibers, aromatic polyamide fibers, at least one inorganic or cork filler, and a suitable binder. The felt sheet can be made by any of the well-known processes for forming such sheets from fibers, fillers and binders, so long as the requisite amounts of these ingredients are employed as hereinafter described. To produce the sheet in accordance with a preferred embodiment of this invention an aqueous slurry comprising phenolic fibers, aromatic polyamide fibers, and at least one inorganic or cork filler is mixed with from about 2 to about 40 parts by weight add-on per 100 parts by weight of the total fiber and filler weight of a soluble salt selected from the group consisting of aluminum salts, ferric salts, and stannic salts followed by the addition of sufficient amount of an alkaline hydroxide to provide a furnish pH within the range of from about six to about ten and preferably from about 7 to about 8. The alkaline hydroxide converts the soluble salts to a water insoluble hydroxide. A synthetic rubber latex is then added to the mixture until the latex precipitates onto the fibers and fillers. Water is removed from the resulting furnish composition to form the felt sheet.

The aqueous furnish composition can also include a latex antioxidant, ceramic fibers, mineral wool, retention aids, biocides, latex curing agents, latex dispersing agents and the like.

The aqueous furnish composition will contain from about 3 to about 60 parts, and preferably from about 5 to 25 parts, by weight of phenolic fibers per 100 parts of the total fiber and filler weights. Suitable phenolic fibers will have nominal fiber lengths within the range of from about 1 mm to about 15 mm, and preferably from about 1 to 5 mm, and nominal fiber diameters within the range of from about 6 microns to about 32 microns, and preferably from about 14 to 18 microns.

The phenolic fibers serve to impart high heat resistance to the gasket-forming product of this invention.

The term phenolic fibers is used herein to signify fibers made from phenol-formaldehyde resin. A particularly suitable phenolic fiber is available from American Kynol Incorporated under the trade designation Kynol TM novoloid fiber (herein after Kynol fiber). Kynol fiber has a specific gravity, at 800° C., of 1.55 and, at 2000° C., of 1.4. It has a tensile strength of 50–60 $Kg/mm^2$, a modulus of 1500–3000 $Kg/mm^2$ and a Young's modulus (g/d) of 35–40.

The aqueous furnish composition will contain from about 5 to about 50 parts by weight, and preferably from about 10 to about 25 parts by weight, of aromatic polyamide fibers. These fibers tend to impart high tensile strength and excellent creep relaxation to the gasket-forming product of this invention.

The term aromatic polyamide fibers is used herein to signify a family of fibers which have been granted the generic name "aramid" by the Federal Trade Commission. Particularly suitable aromatic polyamide fibers include those available from E. I. duPont deNemours and Company under the trade designations "Kevlar," "Kevlar 29," and "Kevlar 49" and "Nomex." Kevlar 49 aromatic polyamide fiber has a tensile strength of 400,000 $lb/in^2$, a modulus of 18,000,000 $lb/in^2$ and a density of 1.44 $g/cm^3$. Kevlar 29 aromatic polyamide fiber has a tensile strength of 400,000 $lb/in^2$, a modulus of 8,500,000 $lb/in^2$ and a density of 1.44 $g/cm^3$. Nomex aromatic polyamide fiber has a density of 1.38 $g/cm^2$ and a tensile strength of 95,000 $lb/in^2$.

The aqueous furnish composition will contain at least one inorganic or cork filler present in an amount within the range of from about 10 to 80 parts, and preferably 40 to 70 parts by weight total inorganic filler per 100 weight parts of the total fiber and filler composition. The inorganic filler will be selected from the group consisting of paper filler clay, wollastonite, talc, calcium carbonate, mica, and diatomaceous earth. Particularly suitable fillers include wollastonite of P-4, P-1 or C-1 grade, all commercially available from Interpace Company, kaolin paper filler clays designated "Hi-Opaque clay," commercially available from Freeport Kaolin Clay Company, "Narvon" paper filler clay, commercially available from Combustion Engineering Inc., and "Klondyke" paper filler clay or "Klondyke KWW" paper filler clay, both commercially available from Engelhart Minerals and Chemicals Corporation. The fillers employed must be chemically inert so that they do not interfere with the precipitation of the rubber latex during formation of the felt sheet.

The aqueous furnish composition will contain from about 10 to about 40 parts by weight add-on of a suitable binder per every 100 parts of the total fiber and filler weight. Any suitable binder can be employed which is used in the prior art to bind fibers and fillers including synthetic rubbers and resins. In a preferred embodiment of the present invention the fibers and fillers are bound together by a synthetic rubber which is deposited on the fibers and fillers by preciptation from a latex of the synthetic rubber. Any suitable synthetic anionic-type rubber latex can be employed—including nitrile rubber, styrene butadiene latexes, carboxylated styrene butadiene latexes, carboxylated acryonitrile butyldiene, polychloroprenes, and the like. These latexes can be used singularly or in combination. Particularly suitable rubber latexes incude Reichhold Corporations's 4700 A nitrile latex, which has 40% total solid content and a pH of 9 and BF Goodrich's 1572X45 Hycar nitrile latex, which has a 47% total solid content, a pH of 6.5, a specific gravity of 0.99 and a Brookfield viscosity of 85 cP.

The aqueous furnish composition will preferably contain about 0.2 to about 2 parts by weight of a latex antioxidant per 100 parts of the total fiber and filler weight. A particularly suitable latex antioxidant is designated "Flectol H," commercially available from Monsanto Industrial Chemicals Company. Flectol H is polymerized 2,2,4-trimethyl-1,2-dihydro quinoline. Other suitable antioxidants include B. F. Goodrich Chemical Company's "Agerite White" antioxidant, which is sym-Di-beta-naphthyl-para-phenylenediamine.

As stated above, ceramic fibers may optionally be added to the acqueous furnish composition of the present invention. Suitable ceramic fibers include Babcock and Wilcox's chopped ceramic fiber available under the trade designation "Kaowool," which is an alumina-silica ceramic fiber that has a melting point of 3200° F., a specific gravity of 2.56, a tensile strength of $1.9 \times 10^5$ lbs/in$^2$ and a modulus of $16.8 \times 10^6$ lbs/in$^2$. Ceramic fibers and mineral wool are considered to be fibers for the purpose of calculating the total amount of fiber and filler content of the composition of the present invention, and can be added at an amount up to about 50 parts total ceramic fiber per 100 parts of the total fiber and filler composition.

As stated above, standard latex curing agents may be employed in conjunction with the rubber latex binders utilized herein. One such standard latex cure package consists of 42 wt% sulfur, 38 wt% zinc 2-mercaptobenzothiazole, and 20 wt% zinc dimethyldithiocarbamate. Other standard latex curing agents or cure packages are well-known in the art and may be similarly employed herein.

It will be understood that the amounts of the ingredients used to produce the gasket forming compositions of the present invention can be varied within the ranges specified, but that they are interdependent and must be varied so that a gasket forming composition as described herein can be produced. For example, those skilled in the art will appreciate that if the lower limits of the ranges for the phenolic fibers and aromatic polyamide fibers are employed, and therefore, that the upper limit of the inorganic or cork filler is used, the lower limit of binder may not be sufficient to bind the large amount of filler.

The following examples demonstrate the preparation of asbestos-free rubberized gasket-forming compositions of this invention. In these examples, the properties of creep relaxation, compressibility and tensile strength were determined according to the procedures set forth in, respectively, ASTM test methods number F-3813, F-36-66, and F-152-72. The compositions' heat aging properties were determined, unless otherwise noted, by heating the composition in an oven for 24 hours at 600° F. and subsequently testing its tensile strength.

EXAMPLE I

| Ingredients | Amount (Parts by weight) |
| --- | --- |
| Kevlar 29 aromatic polyamide fibers | 20 |
| Kynol phenolic fibers | 10 |
| Narvon clay filler | 70 |
| | 100 |
| antioxidant (Flectol H) | 0.6 |
| synthetic rubber latex (Reichhold 4700A nitrile rubber) | 20 |
| aluminum sulfate | 15.1 |
| NH$_4$OH | 2.7 |

To a mixing vessel containing about 300 ml of tap water were added the total amounts of the aromtic polyamide and phenolic fibers and the clay filler. The contents of the mixing vessel were slurried for about one-half to one minute to assure full dispersion of the ingredients. The slurry was diluted with tap water at a temperature of about 70° F. to a total volume of 6.8 liters at 2% consistency and homogeneously mixed using an air stirrer. Next, the total amount of aluminum sulfate was added with stirring for about two minutes, followed by the addition of ammonium hydroxide to a slurry pH of about 7 to 7.5. The total amount of synthetic rubber latex was added with stirring for about 5 minutes until the latex precipitated, that is, the latex deposited on the fibers and fillers thus serving as a drainage aid and a binder in the resulting composition.

The resulting slurry was formed into a hand sheet using a conventional Williams hand sheet mold. The resulting hand sheet was then wet pressed to remove excess moisture and drum dried at a temperature of about 230° F. The resulting dried hand sheet was recovered as rubberized gasket forming composition of this invention suitable for use to produce gaskets. The composition was tested and found to have a creep relaxation of 29%, a tensile strength of 3860, a heat aged tensile strength (after 5 hours in oil at 300° F.) of 3088, a density of 82.5 lb/ft$^3$, and a compressibility of 18.5%.

EXAMPLE II

The procedure of Example I was substantially followed, with the exception that a latex cure package consisting of 42 wt% sulfur, 38 wt% zinc 2-mercaptobenzothiazole, and 20 wt% zinc dimethyldithiocarbamate was added to the aqueous furnish composition along with the synthetic rubber latex. A non-asbestos gasket-forming composition was prepared using the following ingredients:

| Ingredients | Amount (Parts by Weight) |
| --- | --- |
| Kevlar 29 nylon fibers | 25 |
| Kynol phenolic fibers | 5 |
| Narvon clay filler | 70 |
| | 100 |
| Flectol H antioxidant | 0.6 |
| Aluminum sulfate | 10 |
| NH$_4$OH | 8 |
| Reichhold 4700A nitrile rubber latex | 20 |

| Ingredients | Amount (Parts by Weight) |
|---|---|
| latex cure package | 1 |

The resulting product was recovered as a rubberized felt sheet composition, gage 0.0301, suitable for use as a gasket material. The composition had a tensile strength of 7120 psi, a creep relaxation of 12%, and a density of 97.2 lb/ft$^3$.

EXAMPLE III

Using substantially the procedure of Example II, a non-asbestos gasket-forming composition was prepared using the following ingredients:

| Ingredients | Amount (Parts by weight) |
|---|---|
| Kevlar 29 nylon fiber | 20 |
| Kynol phenolic fibers | 20 |
| Kaowool ceramic fibers | 20 |
| Narvon clay filler | 40 |
|  | 100 |
| Reichhold 4700A nitrile rubber latex | 20 |
| latex cure package | 1 |
| Agerite White antioxidant | 0.6 |
| aluminum sulfate | 10 |
| NH$_4$OH | 8 |

The resulting slurry was formed into a hand sheet which was wet pressed and drum dried. The resulting felt sheet gasket composition was tested and found to have a creep relaxation of 10%, a tensile strength of 3780 psi, and a density of 94.5 lb/ft$^3$.

EXAMPLE IV

Using substantially the procedure of Example II, a non-asbestos gasket-forming composition was prepared using the following ingredients.

| Ingredients | Amount (Parts by weight) |
|---|---|
| Kevlar 29 nylon fibers | 15 |
| Kynol phenolic fibers | 15 |
| Kaowool ceramic fibers | 15 |
| Narvon clay filler | 55 |
|  | 100 |
| latex cure package | 1 |
| Flectol H latex antioxidant | 0.6 |
| Aluminum sulfate | 16 |
| NH$_4$OH | 9 |
| Reichhold 4700A nitrile rubber latex | 20 |

The resulting product was recovered as a rubberized felt sheet composition, gage 0.0322", suitable for use as a gasket material. The composition was tested three times and found to have an average tensile strength of 2440 psi, an average heat aged tensile strength of 380 psi, and a density of 80.8 lbs/ft$^3$.

EXAMPLE V

Using substantially the procedure of Example II, a non-asbestos gasket-forming composition was prepared using the following ingredients.

| Ingredients | Amount (Parts by weight) |
|---|---|
| Kevlar 29 nylon fibers | 20 |
| Kynol phenolic fibers | 10 |
| Kaowool ceramic fibers | 15 |
| Narvon clay filler | 55 |
|  | 100 |
| Flectol H latex antioxidant | 0.6 |
| Aluminum sulfate | 16 |
| NH$_4$OH | 9 |
| Reichhold 4700A nitrile rubber latex | 20 |
| latex cure package | 1 |

The resulting product was recovered as a rubberized felt sheet composition, gage, 0.0335", suitable for use as a gasket material. The composition was tested three times and found to have an average tensile strength of 2460 psi and an average heat aged tensile strength of 360 psi. It's density was 79.7 lbs/ft$^3$.

EXAMPLE VI

Using substantially the procedure of Example II, a handsheet was prepared using the following ingredients.

| Ingredients | Amount (Parts by weight) |
|---|---|
| Kevlar 29 nylon fibers | 25 |
| Kynol phenolic fiber | 10 |
| Kaowool ceramic fiber | 20 |
| Narvon clay filler | 45 |
|  | 100 |
| latex cure package | 1 |
| Flectol H latex antioxidant | 0.6 |
| Aluminum sulfate | 16 |
| NH$_4$OH | 9 |
| Reichhold 4700A nitrile rubber latex | 20 |

The resulting product was recovered as a rubberized felt sheet composition, gage 0.0331", suitable for use as a gasket material. The composition was tested three times and found to have a tensile strength of 2580 psi, a heat aged tensile strength of 324 psi, and a density of 80.3 lbs/ft$^3$.

EXAMPLE VII

Using substantially the procedure of Example II, a non-asbestos gasket forming composition was prepared using the following ingredients.

| Ingredients | Amount (Parts by weight) |
|---|---|
| Kevlar 29 nylon fibers | 20 |
| Kynol phenolic fibers | 20 |
| Kaowool ceramic fibers | 30 |
| Narvon clay filler | 30 |
|  | 100 |
| latex cure package | 1 |
| Agerite white antioxidant | .6 |
| NH$_4$OH | 8 |
| Alumina sulfate | 10 |
| Reichhold 4700A nitrile rubber latex | 20 |

The resulting product was recovered as a rubberized felt sheet composition, gage 0.0308", suitable for use as a gasket material. The compsoition was tested three times and found to have an average tensile strength of 3780 psi, an average creep relaxation of 10 percent and a density of 94.5 lbs/ft$^3$.

What is claimed is:

1. An asbestos-free gasket forming composition in weight parts per 100 parts of the total fiber and filler weight about 3 to 60 parts phenolic fibers having lengths of within about 1 mm to about 15 mm: about 5 to 50 parts aramid fibers; about 10 to 80 parts of at least one inorganic filler or cork filler; and 10 to 40 parts add-on of a synthetic rubber binder.

2. The composition of claim 1 further comprising from about 0.2 to about 2 weight parts add-on of a latex antioxidant.

3. The composition of claim 1 wherein said at least one inorganic filler is selected from the group consisting of paper filler clay, wollastonite, talc, calcium carbonate, mica, and diatomaceous earth.

4. The composition of claim 3 wherein the inorganic filler is paper filler clay.

5. The composition of claim 1 further comprising up to about 50 weight parts ceramic fiber per 100 parts of the total fiber and filler weight.

6. An asbestos-free gasket forming composition comprising in weight parts per 100 parts of the total fiber and filler weight about 5 to 25 parts phenolic fibers having lengths of within about 1 mm to about 15 mm; about 10 to 25 parts aramid fibers; about 40 to 70 parts of at least one inorganic fiber or cork filler; and 10 to 40 parts added-on of a synthetic rubber binder.

7. A beater saturated, water-laid asbestos-free, rubberized gasket forming composition produced by removing water from an aqueous furnish composition comprising phenolic fibers having lengths of within about 1 mm to about 15 mm, aramid fibers, at least one inorganic filler or cork filler, a synthetic rubber binder, a soluble salt selected from a group consisting of aluminum salts, ferric salts and stannic salts, and a sufficient amount of a alkaline hydroxide to provide a furnish pH within the range of from about 6 to 10, said alkaline hydroxide serving to convert said soluble salt to a water insoluble hydroxide.

8. The composition of claim 7 further comprising a latex antioxidant.

9. The composition of claim 7 in which said phenolic fibers are employed in an amount within the range of from about 3 to about 60 parts by weight per 100 parts of the total fiber and filler weight.

10. The composition of claim 9 in which said phenolic fibers are employed in an amount within the range of from about 5 to about 25 parts by weight per 100 parts of the total fiber and filler weight.

11. The composition of claim 7 in which the aromatic polyamide fibers are employed in an amount within the range of from about 5 to about 50 parts by weight per 100 parts of the total fiber and filler weight.

12. The composition of claim 11 in which said aromatic polyamide fibers are employed in an amount within the range of from about 10 to about 25 parts by weight per 100 parts of the total fiber and filler weight.

13. The gasket forming composition of claim 7 in which said at least one inorganic filler is selected from the group consisting of paper filler clay, wollastonite, talc, calcium carbonate, mica, and diatomaceous earth.

14. The gasket forming composition of claim 7 in which said at least one inorganic filler or cork filler is employed in a total amount within the range of from about 40 to about 70 parts by weight per 100 parts of the total fiber and filler weight.

15. The gasket forming composition of claim 8 in which said latex antioxidant is employed in the amount within the range of from about 0.2 to about 2 add-on parts by weight per 100 parts of the total fiber and filler weight.

* * * * *